Figure 1:
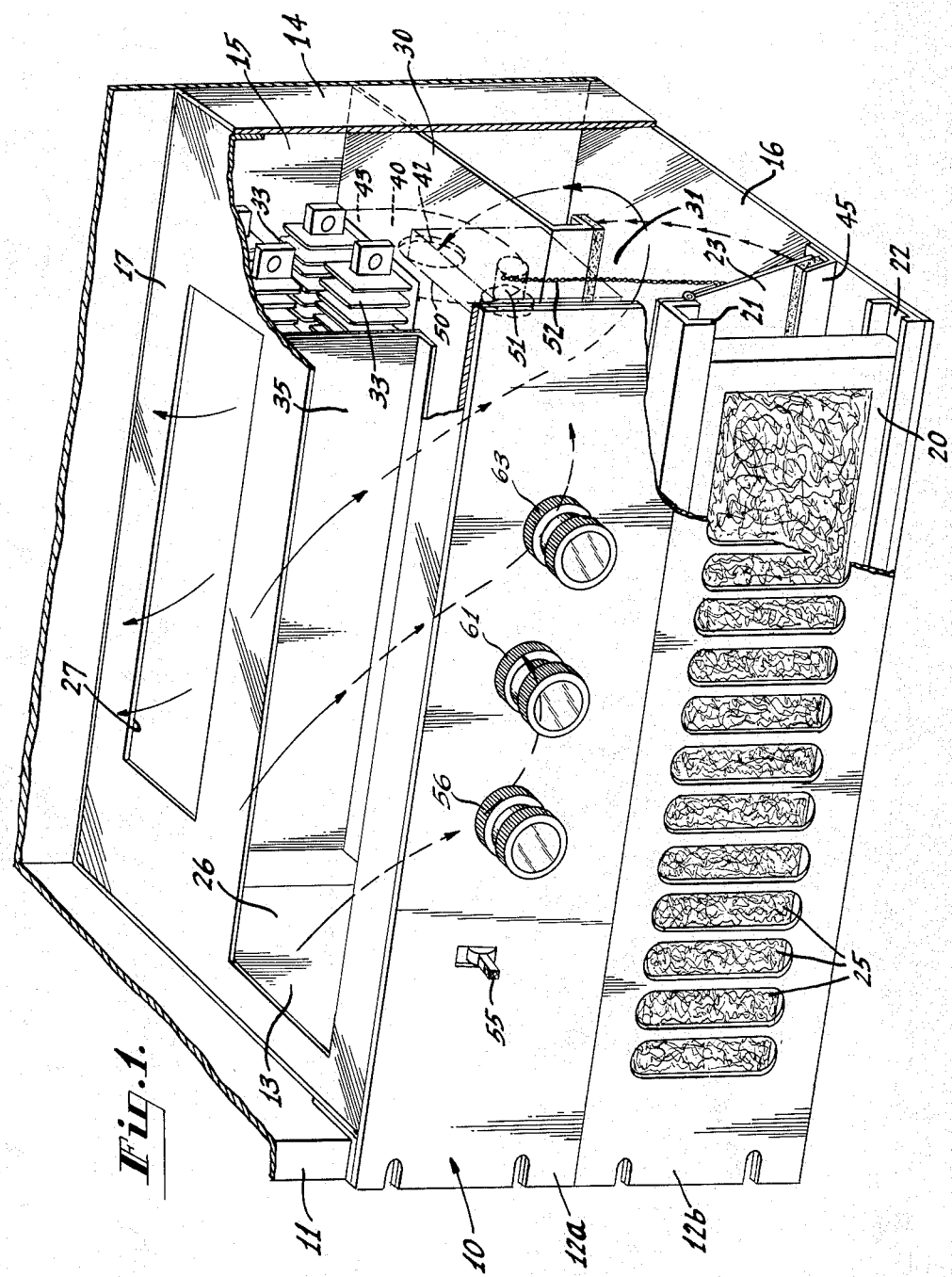

July 19, 1966    A. D. HAY    3,261,397
COMBINED COOLING AND HEATING APPARATUS
Filed Dec. 24, 1963    5 Sheets-Sheet 3

INVENTOR.
ARTHUR DONALD HAY
BY
William A. Balesik
Attorney

July 19, 1966 A. D. HAY 3,261,397
COMBINED COOLING AND HEATING APPARATUS
Filed Dec. 24, 1963 5 Sheets-Sheet 5

INVENTOR.
ARTHUR DONALD HAY
BY
William A. Zalesak
Attorney

United States Patent Office 3,261,397
Patented July 19, 1966

3,261,397
COMBINED COOLING AND HEATING APPARATUS
Arthur Donald Hay, Princeton, N.J., assignor to McLean Engineering Laboratories, a company of New Jersey
Filed Dec. 24, 1963, Ser. No. 333,095
8 Claims. (Cl. 165—122)

My invention relates to an improved combined heating and cooling apparatus particularly suitable for controlling the temperatures of electronic equipment installed at unattended installations.

There are various types of installations of electronic equipment which are subject particularly to low temperatures much of the time. Such installations include field installations, unheated military huts, unattended control stations, automatic telephone switching equipment and like installations. It is desirable to keep such electronic enclosures at roughly 65° F. even at low temperatures, for example, as low as 10° F. But, it is also desirable to flush and cool enclosures or electronic cabinets when the thermostat control indicates that cooling is required.

It is therefore an object of my invention to provide an improved combined heating and cooling apparatus, particularly suitable for controlling the temperatures of electronic equipment at unattended installations.

It is a further object of my invention to provide such an apparatus which can maintain uniform temperatures within enclosures or cabinets subjected to low ambient temperatures and also provide for flushing or cooling with outside air when the temperatures within the enclosures or cabinets go above the desired temperatures.

Briefly, in accordance with my invention, I provide an apparatus comprising a cabinet or housing having an upper front panel and a lower front panel. The lower front panel is provided with a plurality of elongated parallel openings and provides an outside grill. A filter is mounted inside the housing adjacent the lower panel. Mounted in the inside of the cabinet or housing is an internal damper pivoted at its top and normally biased to close the openings in the lower front panel. The damper can also be moved to a horizontal position to uncover the openings in the grill to permit outside air to flow through the housing and be expelled therefrom through another or exhaust opening in the housing. The bottom, sides and back of the housing are closed. The top cover is provided with a pair of oppositely disposed elongated openings, one for exhaust and the other for an intake. Extending from the back of the housing and terminating short of the front panels is a horizontal shelf supporting a heater unit. The shelf is provided with an elongated opening below the heater unit and supports a wall member surrounding the heater unit. The wall member extends between the shelf and the top or cover of the housing, whereby air can be directed over the heater unit and through the exhaust opening in the cover. Mounted below the heater unit is a dual blower fan which has intakes opening into the inside of the housing and scrolls whose exhaust openings communicate with the opening in the shelf below the heater assembly.

The damper is connected by a chain to a motor which rotates the damper from a closed position against the lower front panel to a horizontal position whereby the opening between the upper front panel and the shelf is closed off. When the damper is down, air is drawn into the housing from the top of the housing, into the blower and past the heater assembly which may be off or on, depending upon temperature conditions and out through the exhaust opening. Thermostats control the movement of the damper and the energization of the heater assembly. With the blower on, the thermostat controls the operation of the entire apparatus to bring in circulating air from the outside, with or without cooling, or recirculating the air within the electronic enclosure or cabinet to provide the desired cabinet temperature.

Figure 2:
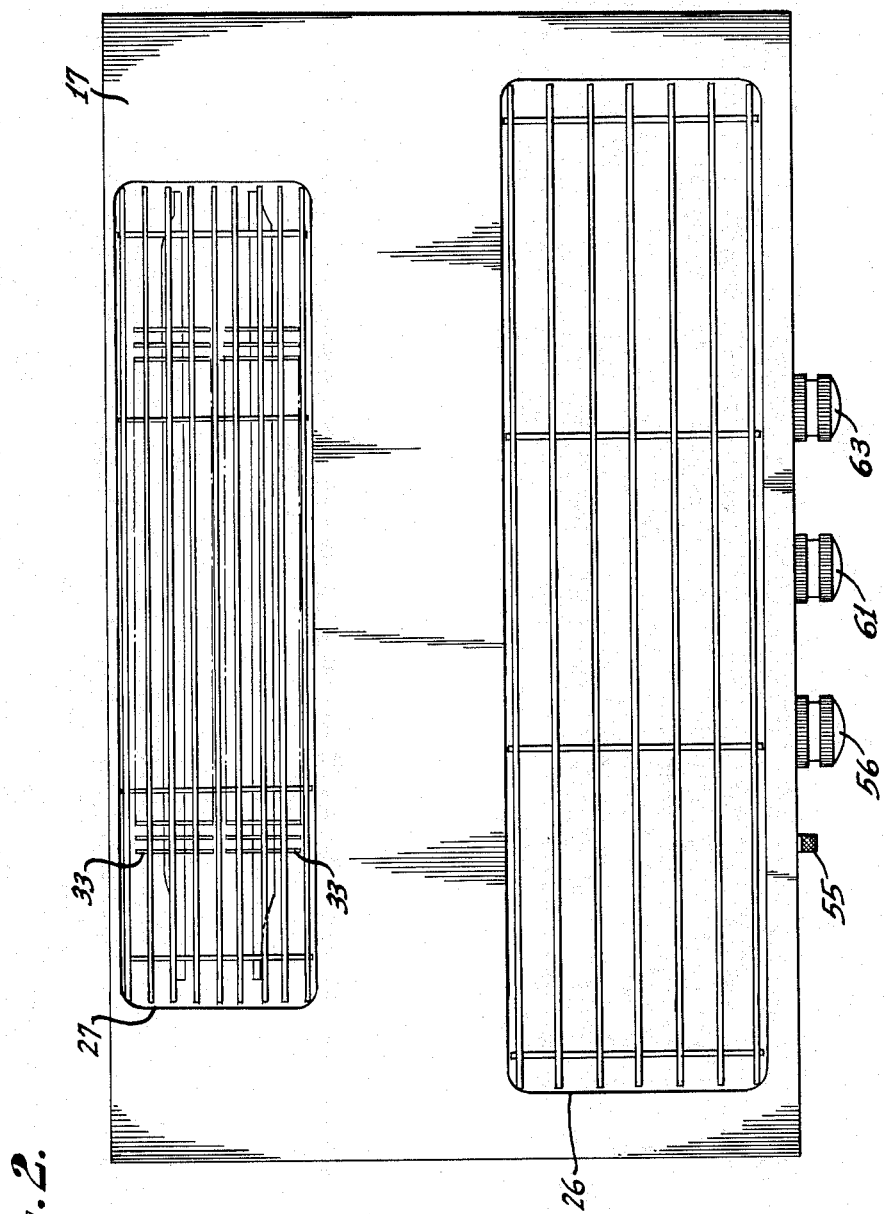
Figure 3:
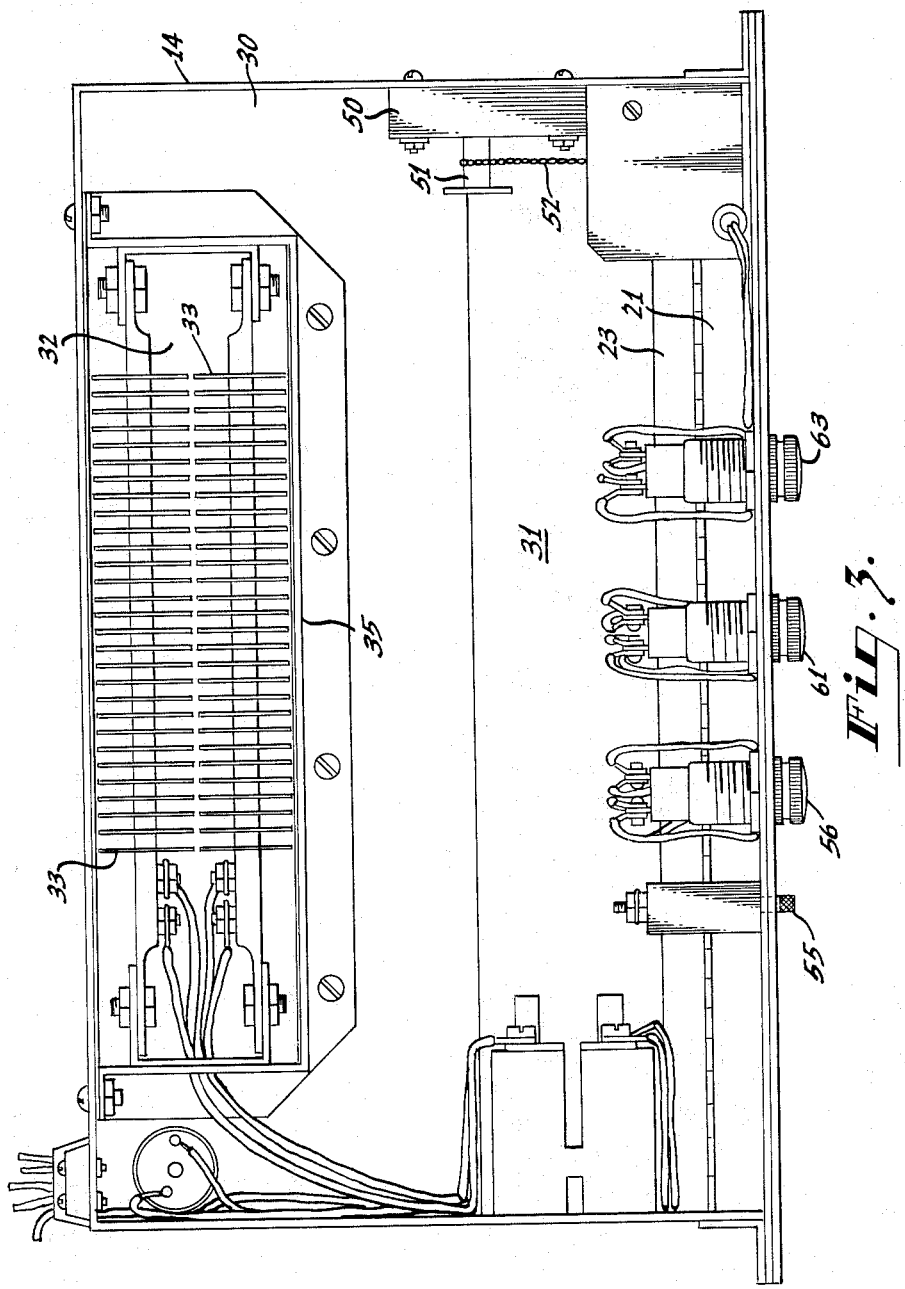
Figure 4:
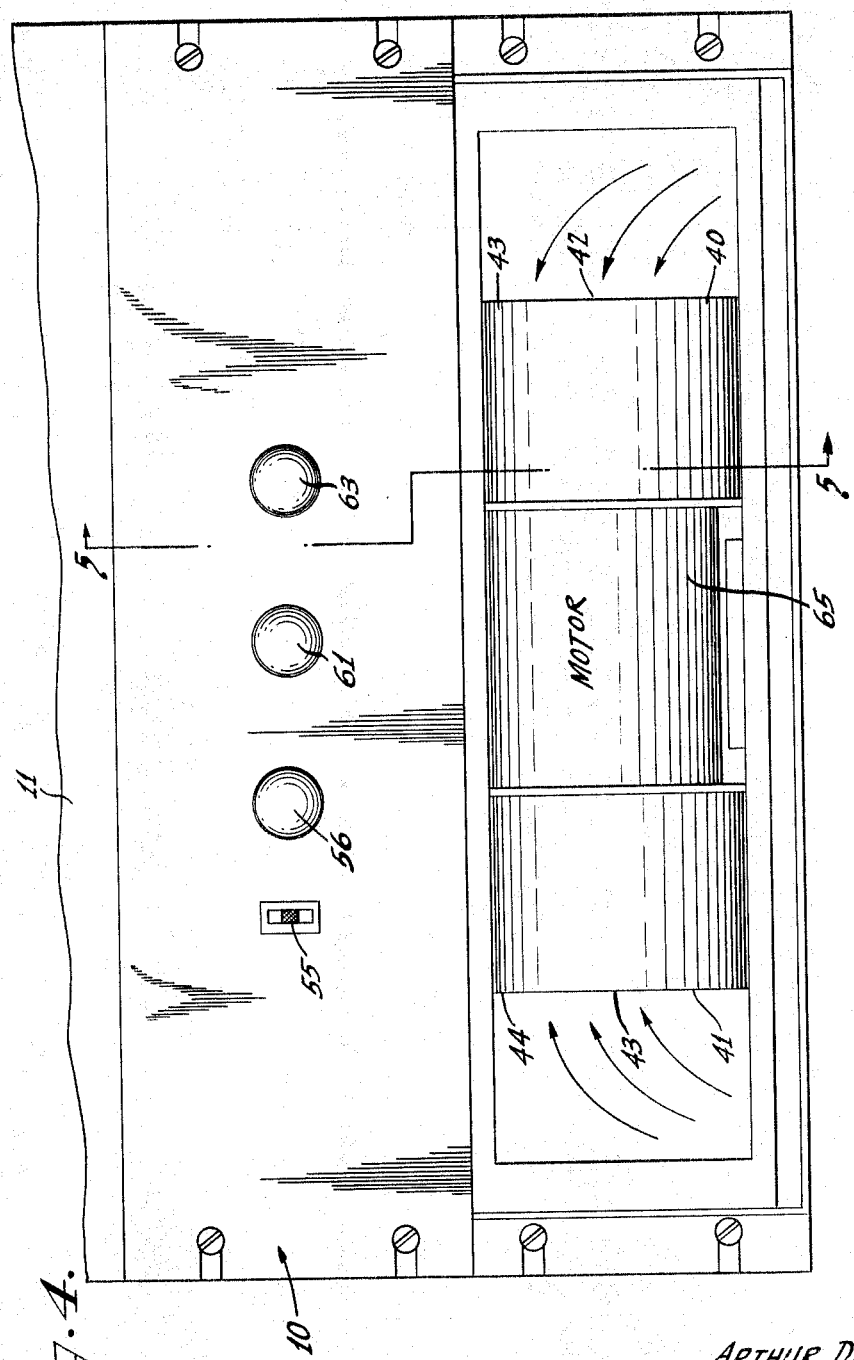
Figure 5:
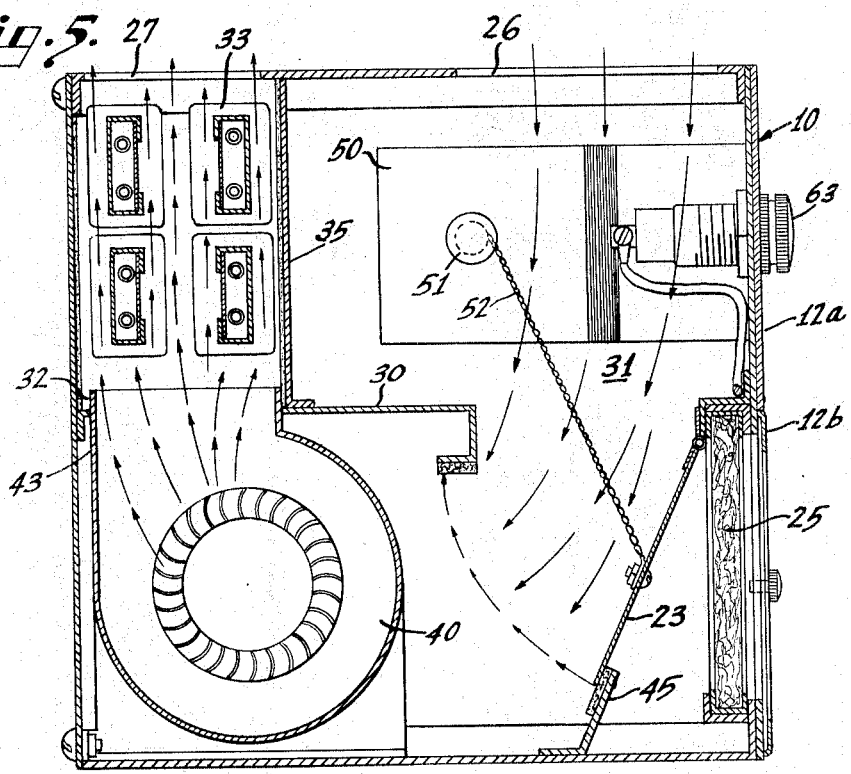
Figure 6:
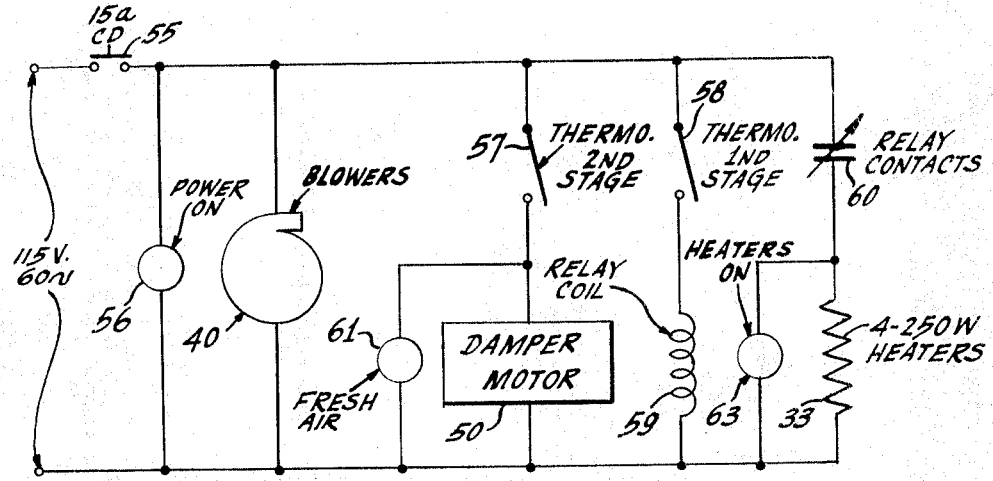

In the drawings:
FIG. 1 is a perspective of apparatus utilizing my invention with parts broken away to show details of construction;
FIG. 2 is a top view of the apparatus shown in FIG. 1;
FIG. 3 is a top view with the cover or top removed to show details of construction;
FIG. 4 is a front elevation of FIG. 1 with the grill (lower panel) and filter removed to show the arrangement of the blowers mounted below the shelf supporting the heater assembly and with the damper raised;
FIG. 5 is a vertical section taken along the line 5—5 of FIG. 4; and
FIG. 6 is a ciricuit diagram used with the apparatus made according to my invention and shown in FIGS. 1 to 5 inclusive.

Referring to the drawings, the enclosure or housing 10, may be received within an enclosure or cabinet 11 housing electronic equipment, in any convenient location preferably beneath the equipment the temperature of which is to be controlled.

The housing 10 comprises an upper front panel 12a and a lower front panel 12b, side and back panels 13, 14 and 15. The bottom panel 16 and top panel or cover 17 complete the housing.

The front panel 12a supports the circuit breaker and indicating lights which will be discussed further below. The lower panel 12b provides the grill as shown with openings 25 into the housing which supports the removable filter 20 within the upper channel member 21, and the lower channel 22. The damper 23 is pivotally mounted at the top on the channel member 21. The top panel or cover member 17 is provided with the openings 26 and 27. Opening 26 provides an intake opening which provides communication between the interior of the enclosure 11 housing electronic equipment and the housing 10. The opening 27 provides the exhaust opening for the housing 10 to the interior of the cabinet 11.

Fixed within the housing 10 is the shelf 30 which extends forwardly from the rear panel 13 toward the front panel 12a, 12b. The width of the shelf 30 is such that it provides with channel 21 an opening 31 between the front panel and shelf 30 which opening is closed when the damper 23 is in horizontal position.

The shelf 30 is provided with an opening 32 (FIG. 5) over which is supported the heater assembly 33 comprising one or more electrical heating units having finned radiators. On one side of the heater assembly and extending between the shelf 30 and the cover 25 is a wall member 35, so that in effect there is a discharge passage extending from inside of the housing through the opening 32 and the exhaust or outlet opening 27 through which air can be circulated past the heating assembly whether heated or not.

As pointed out above, a blower assembly is mounted beneath the shelf 30. It comprises a pair of blowers 40 and 41 having intakes 42 and 43, which open up into the inside of the housing 10. These blowers are connected to a motor 65. The scrolls 43 and 44 including their exhaust are connected to shelf 30 and communicate with the opening 32.

The damper 23 is spring biased to close the bottom opening into the housing 10, and when in the closed position rests against the inclined stop 45. To raise the damper there is provided a high impedance motor 50 having attached thereto a capstan 51 to which a chain 52 is wound when the motor 50 is energized. This chain is connected to the damper 23.

The control circuit for the apparatus described above is shown in FIG. 6. The blowers 40 and 41 run continuously when the combined switch and circuit breaker 55 is closed. Indicator light 56 is on so long as the blowers are energized. Normally the damper motor 50 is energized since the thermostat 57 is closed when the temperature in cabinet 11 is above a predetermined temperature. Under these conditions thermostat 58 is also closed energizing relay coil 59 which keeps relay contacts 60 open (these are normally closed) so that the heater assembly 33 remains deenergized. Under these conditions indicator light 61 is on showing that outside or fresh air is being circulated through the housing and into the cabinet enclosing the electronic equipment since the damper is in horizontal position thus opening the bottom of housing 10, and closing the opening 31. Indicator light 63 is off, showing that the heater 33 is not energized.

When the temperature in the cabinet 11 drops below a predetermined point, the thermostat 57 opens, the indicator light 61 goes out and since the damper motor 50 is deenergized, the spring biased damper rotates downwardly to close the housing 10. This permits air from the inside of the rack 11 to be recirculated, the air being drawn in through the opening 26, opening 31, into the blowers 40 and 41, through the openings 32 and 27 back into the rack. The heat from the electronic equipment within the cabinet 11 is thus utilized to maintain the desired temperature.

If there is an additional temperature drop, thermostat 58 opens deenergizing relay coil 59 permitting relay contacts 60 to close energizing the heater assembly 33. Thus, the recirculated air is additionally heated to maintain the desired temperature. Indicator light 63 is on, indicating that the heater assembly is energized. The thermostat or thermostats 57 and 58 are mounted remotely in the rack or cabinet 11 at a position where the thermostat can sense the average rack or cabinet temperature.

The shelf or supporting panel in effect divides the housing into two compartments, an upper compartment supporting the heater assembly and a lower compartment housing the blowers and the filter, the pivoted damper performing the function of closing off the flow of circulating air either from the outside of the cabinet containing the electronic equipment so that the cabinet air is recirculated or closing off the opening between the upper and lower compartments, and permitting air to flow through the opening in the bottom compartment through the apertured grill or panel and the filter. The front panel, although made as a multiunit panel for convenience, could of course be an integral unit apertured at the bottom to provide access to the lower part of the housing from outside the cabinet housing the electronic equipment.

What is claimed is:

1. A combined heating and cooling apparatus comprising a rectangularly shaped housing having an opening in one side thereof to provide an intake for outside air into said housing, and a pair of openings in another wall portion of said housing for delivery of air to and return of air from a space to be conditioned, a shelf within said housing extending partially across said housing for dividing said housing into two compartments having an opening therebetween oppositely disposed to the air return one of said pair of openings, a pivoted damper movable between the intake opening in said housing and the opening between said compartments for alternately closing one or the other thereof, said shelf providing an opening therein oppositely disposed to the air delivery one of the pair of openings, a heater assembly positioned between said last openings, a wall member on one side of said heater assembly and extending between said last openings, means for moving said damper between alternate positions, and means within said housing for circulating air through said housing and over said heater assembly and out through the delivery one of said openings.

2. A combined heating and cooling apparatus comprising a housing including a multiunit front panel and a top panel, said front panel being apertured to provide an opening for the passage of outside air into the interior of said housing, said top panel having a pair of openings therein for delivery of air and return of air from a space to be conditioned, a shelf within said housing extending toward said front panel but spaced therefrom to provide a first opening between the top and bottom of said housing oppositely disposed to the air return one of said pair of openings, said shelf having a second opening therein oppositely disposed to the air delivery one of the openings in said top panel, a heater assembly mounted above the second opening in said shelf, a wall on one side of said heater assembly and extending between the second opening in said shelf and the air delivery opening in said top panel, a hinged damper mounted within said housing and biased to a first position to close the opening in the front panel, motor means to rotate said damper from said first position to a second position to close the first opening in said shelf, and blower means within said housing mounted below said shelf and having an intake opening into said housing and an exhaust passage communicating with the second opening in said shelf whereby air can be circulated over said heater assembly and through the air delivery opening in said top panel above said heater assembly, said air return opening in the top panel also providing an intake into said housing.

3. A combined heating and cooling apparatus comprising a housing including a front panel and a top panel, said front panel being apertured to provide an opening for the passage of outside air into the interior of said housing, said top panel having a pair of openings therein for delivery of air and return of air from a space to be conditioned, a shelf within said housing extending toward said front panel but spaced therefrom to provide a first opening between the top and bottom of said housing oppositely disposed to the air return one of said pair of openings, said shelf having a second opening therein oppositely disposed to the air delivery one of the openings in said top panel, a heater assembly mounted above the second opening in said shelf, a wall on one side of said heater assembly and extending between the second opening in said shelf and the air delivery opening in said top panel, a hinged damper mounted within said housing and biased to close the opening in the front panel, motor means to rotate said damper from said first position to a second position to close the first opening in said shelf, and blower means within said housing and mounted below said shelf and having an intake opening into said housing and an exhaust passage communicating with the second opening in said shelf whereby air can be circulated over said heater assembly and through the air delivery opening in said top panel above said heater assembly, said air return opening in the top panel also providing an intake into said housing, and a control circuit for said apparatus connected to said blower means, said motor means and said heater assembly, said circuit including thermostatic means responsive to temperature changes for independently controlling said motor means and said heater assembly.

4. A combined heating and cooling apparatus comprising a housing including a front panel and a top panel, said front panel being apertured to provide an opening for the passage of outside air into the interior of said housing, said top panel having a pair of openings therein for delivery of air to and return of air from a space to be conditioned, a shelf within said housing providing a pair of openings between the top and bottom of said housing, one of said openings being oppositely disposed to the air delivery one of the openings in said top panel, a heater assembly mounted above said one of the openings provided by said shelf, a wall on one side of said heater assembly and extending between said one opening provided by said shelf and the air delivery opening in said top panel, a hinged damper mounted within said housing and movable between the opening in said front panel and the other of the openings provided by said shelf, said other opening being oppositely disposed to said air return opening, means to rotate said damper to close selectively said other opening provided by said shelf and the opening in the front panel, means for circulating air mounted within said housing and having an intake opening into said housing and an exhaust passage communicating with said one opening provided by said shelf whereby air can be circulated over said heater assembly and through the delivery opening in said top panel above said heater assembly, the air return opening in the top panel providing an intake into said housing.

5. A combined heating and cooling apparatus comprising a housing having an opening in one side thereof to provide an intake for the passage of outside air into said housing, means providing a pair of openings in another part of said housing for delivery of air and return of air from a space to be conditioned, a shelf within said housing dividing said housing into two compartments and providing openings therebetween oppositely disposed to said air return and air delivery openings respectively, a pivoted damper movable between said opening in one side of said housing and a first of said shelf openings, a heater assembly positioned between a second of said shelf openings and said air delivery opening, a wall member on one side of said heater assembly and extending between said second of said shelf openings and said air delivery opening, and means for moving said damper between alternate positions for selectively closing said opening in one side of the housing and said first shelf opening.

6. A combined heating and cooling apparatus comprising a housing having an opening in one side thereof to provide an intake for the passage of outside air into said housing, means providing a pair of openings in another part of said housing for delivery of air and return of air from a space to be conditioned, a shelf within said housing dividing said housing into two compartments providing openings therebetween oppositely disposed to said air return and air delivery openings respectively, a pivoted damper movable between said opening in one side of said housing and a first of said shelf openings, a heater assembly positioned between a second of said shelf openings and said delivery opening, a wall member on one side of said heater assembly and extending between said second of said shelf openings and said delivery opening means for moving said damper between alternate positions for selectively closing said opening in one side of said housing and said first shelf opening, means for circulating air mounted within said housing, and a control circuit for said means for circulating air through said housing, for said damper and for said heater assembly, said circuit including thermostatic means responsive to temperature changes for independently controlling said damper and said heater assembly.

7. A combined heating and cooling apparatus comprising a housing including a front panel and a top panel, said front panel being apertured to provide an opening for the passage of outside air into the interior of said housing, said top panel having a pair of openings therein for delivery of air and return of air from a space to be conditioned, a shelf within said housing providing a pair of openings between the top and bottom of said housing, one of said openings being oppositely disposed to said air delivery opening in said top panel, a heater assembly mounted above said one of the openings provided by said shelf, a wall on one side of said heater assembly and extending between the one opening in said shelf and said air delivery opening in said top panel, a hinged damper mounted within said housing and movable between the front panel opening and the other of the openings provided by said shelf, motor means to rotate said damper from a position closing said front panel opening to a position to close said other of said openings provided by said shelf, blower means within said housing mounted below said shelf, said blower means having an intake opening within said housing and an exhaust passage communicating with the shelf opening below said heater assembly whereby air can be circulated over said heater assembly and through the opening in said top panel above said heater assembly, the other of said openings in the top panel providing an intake into said housing, and a control circuit for said apparatus connected to said damper motor and said heater assembly, said circuit including thermostatic means responsive to temperature changes for independently controlling said damper motor and said heater assembly.

8. A combined heating and cooling apparatus comprising a housing having an opening in one side thereof to provide an intake for the passage of outside air into said housing, means providing a pair of openings in another wall portion of said housing for delivery of air and return of air from a space to be conditioned, a shelf within said housing for dividing said housing into two compartments and providing openings therebetween oppositely disposed to said air return and air delivery openings respectively, a pivoted damper movable between said opening in said one side of said housing and a first of said shelf openings for alternately closing the last two of said openings, a motor connected to said damper for operating said damper, a second of the openings provided by said shelf being oppositely disposed to said air delivery opening, a heater assembly positioned between said second shelf opening and air delivery opening, a wall member on one side of said heater assembly and extending between said second shelf opening and air delivery opening, motor means for moving said damper between its alternate positions, blower means within said housing having an exhaust passage connected to said second shelf opening, and circuit control means connected to said motor and said heater assembly, said circuit including thermostatic means responsive to predetermined temperatures for selectively controlling the position of said damper and energization of said heater assembly.

References Cited by the Examiner
UNITED STATES PATENTS

| 1,990,985 | 2/1935 | Callahan | 236—49 X |
| 2,235,022 | 3/1941 | Komroff | 236—38 X |
| 2,488,636 | 9/1949 | Mendenhall et al. | |
| 2,750,868 | 6/1956 | Mieczkowski et al. | |
| 2,950,056 | 8/1960 | Baker | 236—49 |
| 3,165,625 | 1/1965 | Potter | 236—49 X |

JAMES W. WESTHAVER, *Primary Examiner.*